United States Patent
Anschuetz et al.

(10) Patent No.: US 10,018,136 B1
(45) Date of Patent: Jul. 10, 2018

(54) METHOD AND CONTROL SYSTEM FOR CONTROLLING A MARINE INTERNAL COMBUSTION ENGINE

(71) Applicant: Brunswick Corporation, Lake Forest, IL (US)

(72) Inventors: Steven M. Anschuetz, Fond Du Lac, WI (US); Michael A. Purdy, Oshkosh, WI (US); Robert Raymond Osthelder, Omro, WI (US); David J. Hilbert, Black Creek, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/597,798

(22) Filed: May 17, 2017

(51) Int. Cl.
| *F02D 41/10* | (2006.01) |
| *F02P 5/152* | (2006.01) |
| *F02D 41/40* | (2006.01) |
| *F02D 11/02* | (2006.01) |

(52) U.S. Cl.
CPC .............. *F02D 41/10* (2013.01); *F02D 11/02* (2013.01); *F02D 41/40* (2013.01); *F02P 5/152* (2013.01)

(58) Field of Classification Search
CPC ........ F02D 41/10; F02D 41/40; F02D 41/045; F02D 11/02; F02P 5/152; F02P 5/1504; F02P 5/1521
USPC .............. 123/299, 300, 436, 406.24, 406.25, 123/406.51, 492; 701/103–105, 110
See application file for complete search history.

(56) References Cited

U.S. PATENT DOCUMENTS

| 4,040,399 | A | 8/1977 | Meininger |
| 4,280,465 | A | 7/1981 | Staerzl |
| 5,735,248 | A | 4/1998 | Matsuura et al. |
| 5,848,582 | A | 12/1998 | Ehlers et al. |
| 5,924,404 | A | 7/1999 | Ruman et al. |
| 5,988,139 | A | 11/1999 | Wasilewski et al. |
| 6,109,986 | A | 8/2000 | Gaynor et al. |
| 6,298,824 | B1 | 10/2001 | Suhre |
| 6,561,158 | B2 | 5/2003 | Yoshida et al. |
| 6,757,606 | B1 | 6/2004 | Gonring |
| 6,770,009 | B2 | 8/2004 | Badillo et al. |
| 7,100,584 | B1 | 9/2006 | Bruestle et al. |
| 7,748,362 | B2 | 7/2010 | Whitney et al. |
| 8,725,390 | B1 | 5/2014 | Snyder et al. |
| 2003/0015175 | A1* | 1/2003 | Andersson .......... F02D 35/0061 123/406.47 |
| 2007/0277780 | A1 | 12/2007 | Akazaki et al. |
| 2010/0175663 | A1* | 7/2010 | Ito ...................... F02D 37/02 123/406.12 |

(Continued)

*Primary Examiner* — Hai Huynh
(74) *Attorney, Agent, or Firm* — Andrus Intellectual Property Law, LLP

(57) ABSTRACT

A method for controlling a marine engine for propelling a marine vessel includes receiving user input as a user input device to control acceleration of a marine vessel, detecting a rapid acceleration command based on the user input, and determining an advanced spark timing based on at least one of engine speed and engine load, wherein the advanced spark timing adjusts a base spark time by a spark advance offset. A fuel increase is then determined based on the spark advance offset, and then an increased fuel injection amount is determined by increasing a base fuel injection amount by the fuel increase. Spark and fuel delivery are then controlled for one or more cylinders of the marine engine based on the advanced spark timing and the increased fuel injection amount.

20 Claims, 7 Drawing Sheets

(56) References Cited

U.S. PATENT DOCUMENTS

2015/0159573 A1* 6/2015 Glugla ................ F02D 41/1498
701/103
2017/0314490 A1* 11/2017 Andersson .......... F02D 41/1454

* cited by examiner

METHOD AND CONTROL SYSTEM FOR CONTROLLING A MARINE INTERNAL COMBUSTION ENGINE

FIELD

The present disclosure relates to internal combustion engines used to power marine propulsion devices on marine vessels.

BACKGROUND

U.S. Pat. No. 5,848,582 discloses a control system for a fuel injector system for an internal combustion engine that is provided with a method by which the magnitude of the start of air point for the injector system is modified according to the barometric pressure measured in a region surrounding the engine. This offset, or modification, of the start of air point adjusts the timing of the fuel injector system to suit different altitudes at which the engine may be operating.

U.S. Pat. No. 5,924,404 discloses a direct fuel injected two-stroke engine that controls spark ignition timing and/or ignition coil dwell time on a cylinder-specific basis. The engine also preferably controls fuel injection timing and amount and injection/delivery duration on a cylinder-specific basis. Cylinder-specific customization of spark ignition and fuel injection allows better coordination of spark with fuel injection which results in better running quality, lower emissions, etc. Memory in the electronic control unit for the engine preferably includes a high resolution global look-up table that determines global values for spark ignition and fuel injection control based on engine load (e.g. throttle position, manifold air pressure, etc.) and engine speed. Memory in the electronic control unit also includes a plurality of low resolution, cylinder-specific offset value look-up tables from which cylinder-specific offset values for spark ignition and fuel injection can be determined, preferably depending on engine load and engine speed. The offset values are combined with the global values to generate cylinder-specific control signals for spark ignition and fuel injection.

U.S. Pat. No. 5,988,139 discloses an engine control system that digitally stores corresponding values of timing angles and engine speeds and selects the timing angles based on the operating speed of the engine. In the engine speed range near idle speed, the timing angle is set to a pre-selected angle after top dead center (ATDC) and the relationship between engine speed and timing angle calls for the timing angle to be advanced from the pre-selected angle after top dead center (ATDC) to successively advancing angles which subsequently increase angles before top dead center (BTDC) as the engine increases in speed. In one application, a timing angle of 10 degrees after top dead center (ATDC) is selected for an engine idle speed of approximately 800 RPM. This relationship, which is controlled by the engine control module, avoids stalling the engine when an operator suddenly decreases the engine speed.

U.S. Pat. No. 6,298,824 discloses a control system for a fuel injected engine including an engine control module that receives signals from a throttle handle that is manually manipulated by an operator of a marine vessel. The engine control module also measures engine speed and various other parameters, such as manifold absolute pressure, temperature, barometric pressure, and throttle position. The engine control module controls the timing of fuel injectors and the injection system and also controls the position of a throttle plate. No direct connection is provided between a manually manipulated throttle handle and the throttle plate. All operating parameters are either calculated as a function of ambient conditions or determined by selecting parameters from matrices which allow the engine control module to set the operating parameters as a function of engine speed and torque demand, as represented by the position of the throttle handle.

U.S. Pat. No. 6,757,606 discloses a method for controlling the operation of an internal combustion engine that includes the storing of two or more sets of operational relationships which are determined and preselected by calibrating the engine to achieve predetermined characteristics under predetermined operating conditions. The plurality of sets of operational relationships are then stored in a memory device of a microprocessor and later selected in response to a manually entered parameter. The chosen set of operational relationships is selected as a function of the selectable parameter entered by the operator of the marine vessel and the operation of the internal combustion engine is controlled according to that chosen set of operational parameters. This allows two identical internal combustion engines to be operated in different manners to suit the needs of particular applications of the two internal combustion engines.

U.S. Pat. No. 8,725,390 discloses systems and methods for optimizing fuel injection in an internal combustion engine that adjust start of fuel injection by calculating whether one of advancing or retarding start of fuel injection will provide a shortest path from a source angle to a destination angle. Based on the source angle and a given injection pulse width and angle increment, it is determined whether fuel injection will overlap with a specified engine event if start of fuel injection is moved in a direction of the shortest path. A control circuit increments start fuel injection in the direction of the shortest path if it is determined that fuel injection will not overlap with the specified engine event, or increments start fuel injection in a direction opposite that of the shortest path if it is determined that fuel injection will overlap with the specified engine event.

The above-noted patents are hereby incorporated by reference in their entireties.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method for controlling a marine engine for propelling a marine vessel includes receiving user input at a user input device to control acceleration of a marine vessel, detecting a rapid acceleration command based on the user input, determining an advanced spark timing based on at least one of engine speed and engine load, wherein the advanced spark timing adjusts a base spark time by a spark advance offset. A fuel increase is then determined based on the spark advance offset, and an increased fuel injection amount is determined by increasing a base fuel injection amount by the fuel increase. Spark and fuel delivery are then controlled for one or more cylinders of the marine engine based on the advanced spark timing and the increased fuel injection amount.

A marine propulsion system includes a marine internal combustion engine having a plurality of pistons that move within cylinders to cause rotation of a crankshaft, a user input device for controlling acceleration of a marine vessel, and a control module. The control module is configured to detect a rapid acceleration command provided at the user input device, determine an advanced spark timing based on at least one of engine speed and engine load, wherein the advanced spark timing adjusts a base spark time by the spark advance offset. The control module determines a fuel increase based on the spark advance offset, and determines an increased fuel injection amount by increasing a base fuel injection amount by the fuel increase. The control module then controls a spark for one or more cylinders of the marine engine based on the advanced spark timing and controls fuel delivery for one or more cylinders of the marine engine based on the increased fuel injection amount.

BRIEF DESCRIPTION OF THE DRAWINGS

The present disclosure is described with reference to the following Figures.

DETAILED DESCRIPTION

Figure 1:
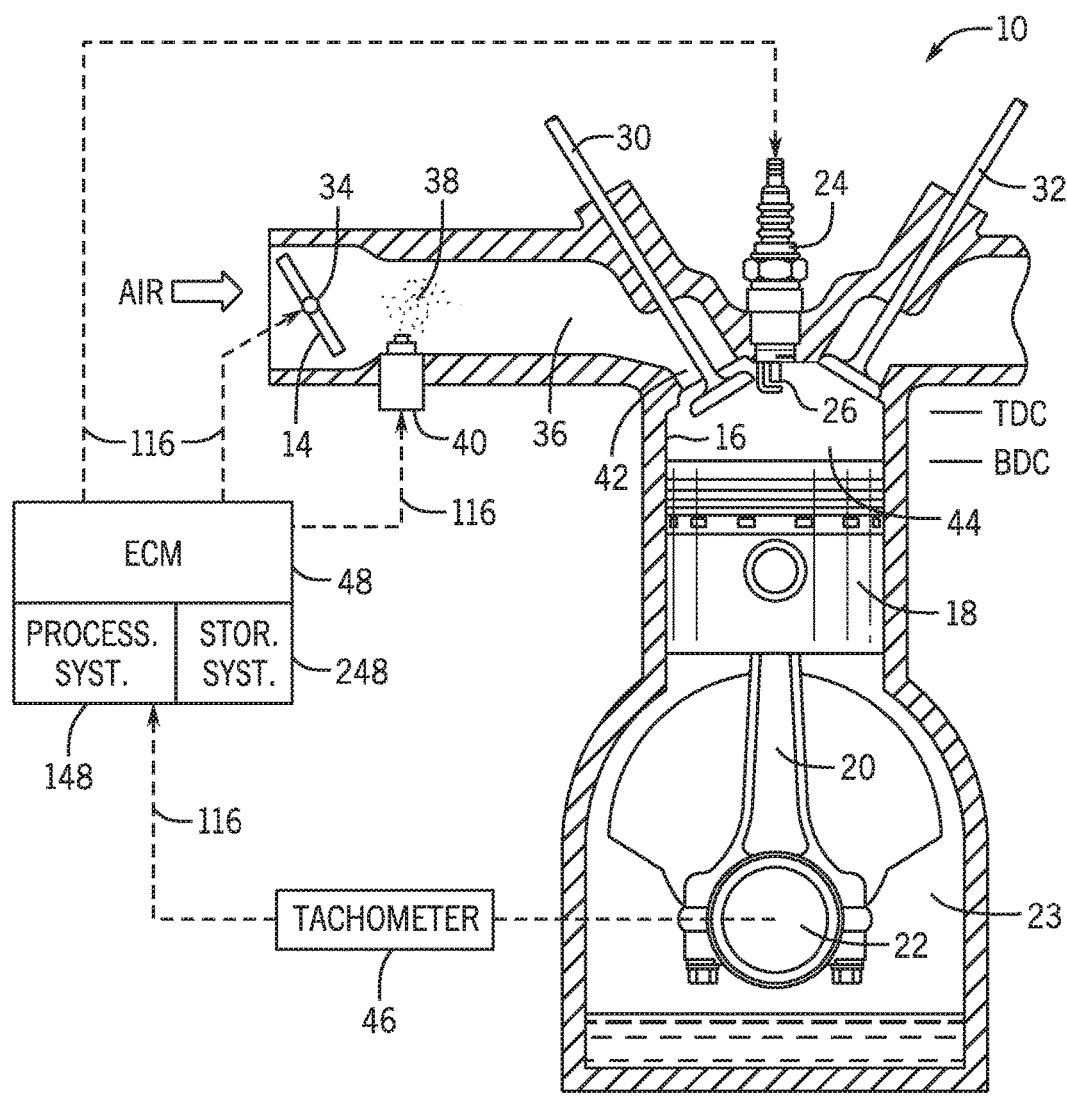
FIG. 1 is a schematic diagram of an exemplary marine engine.

FIG. 1 shows an exemplary, but highly simplified, schematic of a four cycle marine internal combustion engine 10 for a marine application. Although only one cylinder 16 is shown, it should be understood that in most applications of marine internal combustion engines, a plurality of cylinders 16 are typically used.

Within the cylinder 16, a piston 18 is disposed for reciprocating movement therein. The piston 18 is attached to a connecting rod 20 which, in turn, is attached to a crankshaft 22. The crankshaft 22 rotates about an axis within a crankcase 23 and this rotational movement causes the connecting rod 20 to move the piston 18 back and forth within the cylinder 16 between two limits of travel. The position shown in FIG. 1 represents the piston 18 at its bottom dead center (BDC) position within the cylinder 16. After the crankshaft 22 rotates 180 degrees about its axis, the piston 18 will move to its uppermost position at top dead center (TDC). A sparkplug 24 is configured to provide an igniting spark at its tip 26 to ignite a mixture of fuel and air within the combustion chamber 44.

An intake valve 30 and an exhaust valve 32 are shown, with the intake valve 30 being shown in an opened position and the exhaust valve 32 being shown in a closed position. The throttle valve 14 is pivotable about point 34 to regulate the flow of air through an air intake conduit 36 of the marine engine 10. Fuel 38 is introduced into the air intake conduit 36, in the form of a mist, via fuel injector 40.

During operation of the engine shown in FIG. 1, air flows through the air intake conduit 36 under the control of the throttle valve 14. Fuel 38 introduced into the air stream via fuel injector 40 passes with the air through an intake port 42, which conducts the air/fuel mixture into the combustion chamber 44. In other embodiments, the fuel 38 may be injected directly into the combustion chamber 44, i.e., in a direct injection arrangement. The spark time of the engine determines the point, relative to the rotation of the crankshaft 22, when the sparkplug 24 is fired to ignite the air/fuel mixture within a combustion chamber 44. If the sparkplug 24 fires before the piston 18 reaches its uppermost position within cylinder 16, it is referred to as being fired before top dead center (BTDC). If the sparkplug 24 is fired when the piston 18 is on its way down from its uppermost position in FIG. 1, it is referred to as being fired after top dead center (ATDC). In most applications of internal combustion engines, the timing is set to fire the sparkplug 24 at some crank angle before top dead center (BTDC). The crankshaft 22 rotates through 360 degrees of rotation as the piston 8 moves through its entire reciprocating motion. It is typical to refer to spark time in terms of the crank angle before top dead center (BTDC) or after top dead center (ATDC), with reference to the position of the piston 18 when the igniting spark is provided at the tip 26 of the sparkplug 24.

With continued reference to FIG. 1, a tachometer 46 is shown schematically connected in signal communication with the crankshaft 22 or some other device, such as gear tooth wheel, connected to the crankshaft 22 to allow its rotational speed to be measured. This information from the tachometer 46 is provided to the engine control module (ECM) 48. In a typical application, the ECM 48 comprises a processing system 148 that executes instructions, software, configured to enable the ECM 48 to optimally control the spark time. A signal is sent from the ECM 48 to cause the sparkplug 24 to fire. In certain embodiments, the control signal from the ECM 48 is sent to an ignition system 76 (FIG. 2) comprising one or more transistor(s), ignition coil(s), sparkplug(s) 24, etc. to carry out spark generation according to the control instruction provided by the ECM 48. It should be understood that FIG. 1 is highly simplified for purposes of clarity and to permit the general operation of the marine internal combustion engine 10 to be described.

The throttle valve 14 in FIG. 1 is typically caused to pivot about its center of rotation 34 by mechanical movement of the throttle valve 14 in response to an operator command. For example, with marine internal combustion engines 10 used in conjunction with marine propulsion devices, the throttle valve 14 is caused to pivot about point 34 in response to an operator moving a throttle lever forward to demand increased torque (and thus acceleration). It should be understood that movement of the throttle valve 14 from a closed position to an open position increases the operational speed of the engine and movement of the throttle valve 14 from an open position to a closed position reduces the operational speed of the engine.

Figure 2:
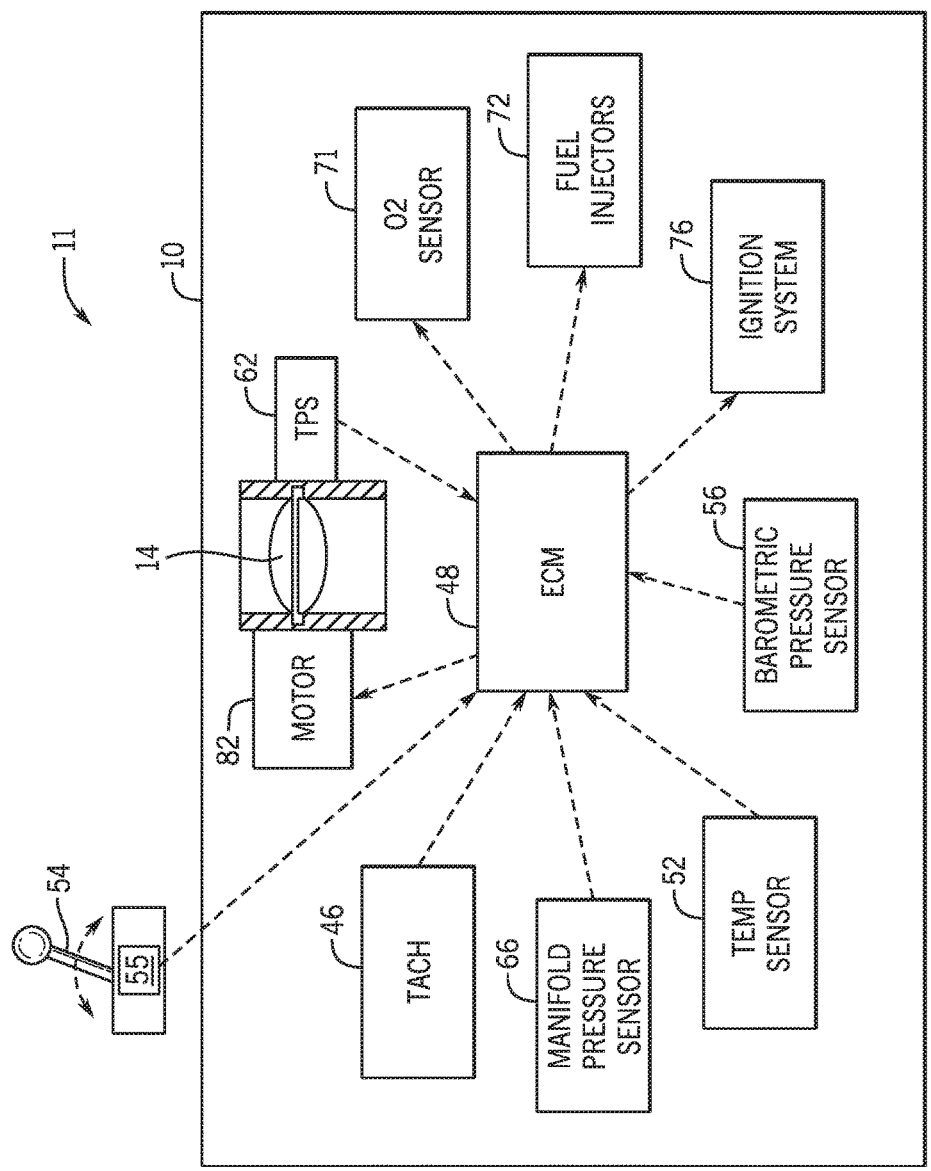
FIG. 2 is a schematic diagram of a marine propulsion system, and particularly a control arrangement within the marine propulsion system.

FIG. 2 is a highly simplified schematic representation of a control system for a marine engine 10 containing the cylinder 16 shown in FIG. 1. The ECM 48 is connected in signal communication with several sensors in order to enable the ECM 48 to properly select the magnitudes of fuel and air that are provided to each cylinder of the marine engine 10, as well as to select the spark timing. For example, the ECM 48 is provided with information that represents the actual angular position of the throttle valve or plate, 14. This information is provided by a throttle position sensor 62. Another sensor signal provided to the ECM 48 represents the physical position of a throttle lever 54. The throttle lever 54, as an exemplary user input device, is manually moveable by a user to control torque and acceleration of a marine vessel. The position of the throttle lever 54 is sensed by position sensor 55, which provides a signal to the ECM 48 representing the position of the throttle lever 54. Thus, the change position of the throttle lever 54 represents a demand for a change in vehicle speed, i.e. acceleration or deceleration. In certain embodiments, the system 11 may include only one or the other of the throttle position sensor 62 or the lever position sensor 55, such as in embodiments having a mechanical connection between the throttle lever 54 and the throttle valve 14. The ECM 48 is also provided with a signal from the tachometer 46 representing engine speed. In various embodiments, the signal can be provided by a tachometer 46 or any other instrument capable of providing a signal to the ECM 48 representing engine speed. The ECM is also provided with a signal from manifold pressure sensor 66 representative of manifold pressure. Any type of manifold pressure sensor 66 capable of providing information to the ECM 48 representative of manifold absolute pressure can be used for these purposes. The ECM 48 is also provided with information representing the temperature at one or more selective locations on the marine engine 10. Various types of temperature sensors 52 are suitable for these purposes. The ECM 48 is also provided with information regarding atmospheric pressure, from a barometric pressure sensor 56. In certain embodiments, the atmospheric pressure may be measured by the manifold pressure sensor 66. An oxygen sensor 71 provides a reading related to an amount of oxygen, for example in the engine's exhaust, to the ECM 48. The oxygen sensor 71 may be a wide-band oxygen sensor.

The ECM 48 provides certain output signals to control the operation of certain components relating to the marine engine 10. For example, the ECM 48 provides signals to fuel injectors 72 to control the amount and timing of fuel provided per each engine cycle. The ECM 48 also controls the ignition system 76 and provides control instructions regarding the spark time and spark energy of each ignition event.

FIG. 2 shows the schematic representation of a marine propulsion system 11, where various sensors and components are used by the ECM 48 to control the operation of the marine engine 10 in response to the position of a throttle lever 54. It should be understood that the position of the throttle lever 54 is, in actuality, a request by the operator of a marine vessel for a relative amount of torque to be provided to the propeller shaft of the propulsion system. The position of the throttle lever 54 can be moved by the operator of the marine vessel at any time during the operation of the marine vessel, and such position changes are sensed by position sensor 55. For example, if the marine vessel is traveling at a generally constant speed, the operator of the marine vessel can move the throttle lever 54 in one direction to increase the speed, accelerate, by providing increased torque to the propeller shaft or, alternatively, the operator of the marine vessel can move the throttle lever 54 in the opposite direction to decrease the amount of torque provided to the propeller shaft and, as a result, decelerate the marine vessel. It should be noted that in certain embodiments the system may be a drive-by-wire system having no direct physical connection between the throttle lever 54 and the throttle valve 14. Instead, the ECM 48 receives signals that represent the position of the throttle lever 54 and combines that information with other information relating to the operation of the marine engine 10 to provide control instructions to cause motor 82 to rotate the throttle valve (or plate) 14 to a desired position to achieve the command received at the throttle lever 54.

FIG. 1 shows a schematic of a control module for controlling the marine engine 10 and its associated components, exemplified herein as ECM 48. It should be understood that, in other embodiments, different control module(s) could instead be used, such as one or more control modules dedicated to controlling one or more specific functions of the marine engine 10 or associated components or systems. In the example shown, the control module 48 is programmable and includes a processing system 148 and storage system 248. The control module 48 can be located on the marine vessel and/or propulsion device, and can communicate with various components of the marine vessel via a peripheral interface and wired and/or wireless links, as will be explained further herein below. Although FIGS. 1 and 2 show one control module 48, the marine propulsion system 11 may include more than one control module. Portions of the method disclosed herein below can be carried out by a single control module or by several separate control modules. If more than one control module is provided, each can control operation of a specific device or sub-system on the marine vessel and may cooperate to execute the steps described herein.

Aspects of the disclosure are described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more control modules.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include storage system 248 comprising memory (shared, dedicated, or group) that stores code executed by the processing system 148. The term "code" may include software, firmware, and/or microcode, and may refer to programs, routines, functions, classes, and/or objects. The term "shared" means that some or all code from multiple control modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system 248 can comprise any storage media readable by the processing system 148 and capable of storing software. The storage system 248 can include volatile and non-volatile, removable and non-removable media implemented in any method or technology for storage of information, such as computer-readable instructions, data structures, software program modules, or other data. The processing system 148 includes at least one processor, which may be a microprocessor, a general purpose central processing unit, an application-specific processor, a microcontroller, or any other type of logic-based device. The processing system 148 may also include circuitry that retrieves and executes software from storage system 248. Processing system 148 can be implemented within a single processing device but can also be distributed across multiple processing devices or sub-systems that cooperate in executing program instructions.

The control module 48 communicates with one or more components of the control system via the I/O interfaces and one or more communication link(s), which can be a wired or wireless. The control module 48 is capable of monitoring and controlling one or more operational characteristics of the marine propulsion system 11 and its various subsystems by sending and receiving control signals via such communication link(s) 116. In one example, the communication link 116 is a controller area network (CAN) bus, but other types of links could be used. It should be noted that the extent of connections of the communication link shown herein by dotted lines is for schematic purposes only, and the communication link 116 in fact provides communication between the control module 48 and each of the peripheral devices and sensors noted herein, although not every connection is shown in the drawings for purposes of clarity. Moreover, the dotted lines are meant only to demonstrate that the various control elements are capable of communicating with one another, and do not represent actual wiring connections between the various elements, nor do they represent the only possible paths of communication between the elements.

The storage system 248 may store lookup tables for use by the ECM 48 executing control instructions in order to determine values for controlling spark ignition and fuel injection, as well as many other variables relating to the marine engine 10. For example, the storage system 248 may store a high resolution global lookup tables that provide base values for spark timing and fuel injection amount based on engine load (e.g., which may be based on throttle position manifold air pressure, etc.) and engine speed. These base values may be used to provide steady state control operations in a range of normal operating conditions. Additionally, the storage system 248 may include a plurality of lookup tables containing offsets, or values that modify the base values, for the spark timing and fuel injection amount provided in the base lookup tables. These additional lookup tables may be used to provide modified control operation during transient conditions, such as conditions that arise quickly, occur infrequently, and/or are only sustained for a relatively short period of time.

The inventors have recognized that control methods and systems are needed to control certain marine engines in order to provide additional torque output from the marine engine 10 during times when rapid or maximum acceleration is demanded by a user at a user input device, such as when a marine vessel is at idle or low speed and a user suddenly advances the throttle lever 54 to a maximum, or near maximum, wide open throttle (WOT), position. The inventors recognized that in certain applications, torque output from the marine engine 10 could be increased for a short period of time during the acceleration period of the marine vessel. For example, transient control of spark time and fuel injection amount can be used to increase the initial acceleration of the marine vessel—e.g., to improve the overall acceleration time—thus providing better acceleration performance in very high demand, or "holeshot," scenarios.

While the base operating conditions for running the marine engine 10 at steady state are calibrated to balance spark and fuel to provide safe and sustainable operating conditions, the inventors recognized that significant torque gains can be realized by increasing the fuel along the WOT curve to increase the knock margin, which in turn allows for the spark to be advanced in order to increase peak torque output. However, through their experimentation and research regarding relevant control parameters, the inventors recognized that such increased fueling and advanced spark conditions are likely to cause problems if sustained for more than a short period of time, such as beyond 10 or 15 seconds (which is an exemplary value that could vary significantly depending on the engine and the sustained conditions). For example, sustaining the increased fueling along the WOT curve for more than a short period can cause significant problems, such as fuel dilution of the lubricating oil, spark plug fouling, and oxygen sensor damage.

Thus, while base spark time and fuel injection amount calibrations are developed for sustained implementation, transient spark timing and fuel amount values may be utilized for a short time in order to maximize output during an initial acceleration period. Here, transient spark advance and a corresponding fuel increase can be determined and added to the base spark time and base fuel injection values. Where, as here, maximum acceleration performance is required and steady state operation is not likely, base spark times and fuel injection amounts are developed with a balance of spark and fuel so that enough fuel is added to reduce knock (but not so much as to cause fuel dilution of the lubricating oil), and enough spark is added to maximize the performance while staying away from the knock occurrence angle. Exhaust gas temperatures can also influence fueling in these areas, which are accounted for in the base fuel calculations. The knock occurrence angle is the crank angle BTDC where knock occurs. The spark time is set to be sufficiently far away from (retarded from) the knock occurrence angle so that the risk of knock is minimized. This calculation is sometimes referred to as the maximum brake torque (MBT), which is the spark timing giving the best engine output at a given air-fuel mixture. The MBT typically accounts for a knock margin, which is an amount at which the operating spark time should remain away from the knock occurrence angle. The greater the knock margin, the less readily the knocking phenomenon occurs. It is typically desirable to have a relatively large knock margin at high engine load values to take additional precautions to avoid knock. Thus, the spark time in base spark lookup tables, or maps, is typically retarded by an additional amount for high load conditions. This decreases the torque output at those high load conditions.

The transient control strategy is implemented based on user input through user input device that controls the acceleration of the marine vessel. For example, the rapid acceleration command, and thus implementation of the transient increased acceleration control strategy, may be implemented based on the user's movement of the throttle lever 54 by at least a predefined amount at a predetermined rate. For example, the control strategy may detect a rapid acceleration command from a user when the throttle lever 54 is moved from a lower threshold position to an upper threshold position within a predetermined amount of time. For example, the rapid acceleration command may require the throttle lever 54 to move from the lower threshold position 57A to the upper threshold position 57B in at least a predetermined time of 3 seconds. In other embodiments, the predetermined time may be less than 3 seconds, such as 2 seconds or 1 second, such as to focus on events where the operator is demanding maximum possible acceleration starting from idle (or near idle) conditions.

Figure 3:
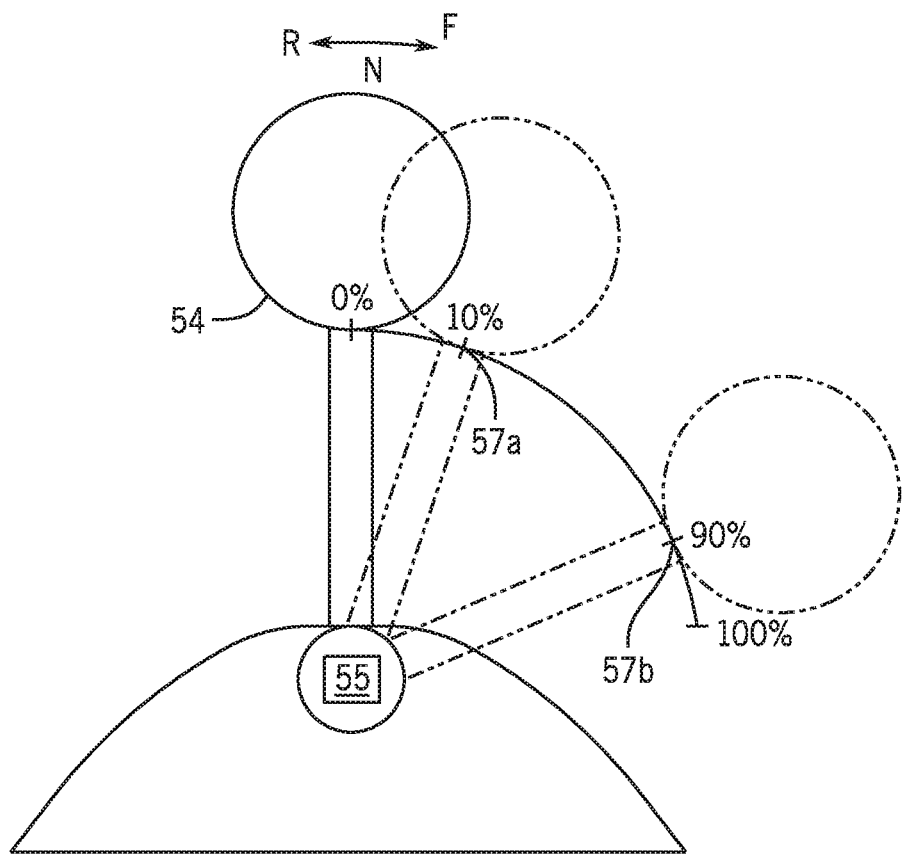
FIG. 3 schematically depicts an exemplary user input device for use an embodiment of the presently disclosed system and method.

FIG. 3 provides one example, where the lower threshold position 57A is at 10% of the maximum forward torque demand positions between 0% and 100%, and 57B represents an upper threshold position. In the example, the lower threshold position 57A is set at 10% of the maximum forward lever positions, and the upper threshold position 57B is set at 90% of the maximum available positions. In various embodiments, the lower threshold position 57A may be set lower or higher than 10%, and the upper threshold position 57B may likewise be set higher or lower than 90%. However, the threshold positions are set to provide threshold requirements indicating that the user is demanding as much performance as possible, such as in a scenario where the engine is starting at idle (or near idle) conditions and WOT is suddenly demanded. Thus, the threshold positions 57A, 57B may be calibrateable values for a particular marine engine 10 and marine vessel, as well as for expected user demands and operating conditions.

In other embodiments, the rapid acceleration transient control strategy may be triggered based on input data from a different user input device, such as a button or graphical user interface element on a touchscreen whereby the user activates the rapid acceleration mode. For example, such user input device may be available for the user to engage the strategy prior to moving the throttle lever 54.

Once the transient rapid acceleration control strategy is implemented, an advanced spark time is calculated. In one embodiment, a spark advance offset is determined and applied to the base spark time, such as determined by a base map, or lookup table, providing spark times for steady-state operating conditions. In other embodiments, the rapid acceleration control strategy may implement a single lookup table containing the total advanced spark time based on the engine speed and/or engine load. A fuel increase is also determined, which is an amount increase over the base fuel mount, such as provided by the base fuel injection map, or lookup table. For example, the spark advance offset may be determined by accessing a lookup table of offset amounts based on engine speed and engine load. In an embodiment having a single lookup table comprising advanced spark times, the fuel increase may be based on a difference between the advanced spark lookup table value and the corresponding base lookup table value. A fuel increase is then determined based on the spark increase in order to provide enough fuel to sufficiently increase the knock margin for the given advanced spark time at various speed and load points.

Figure 4A:
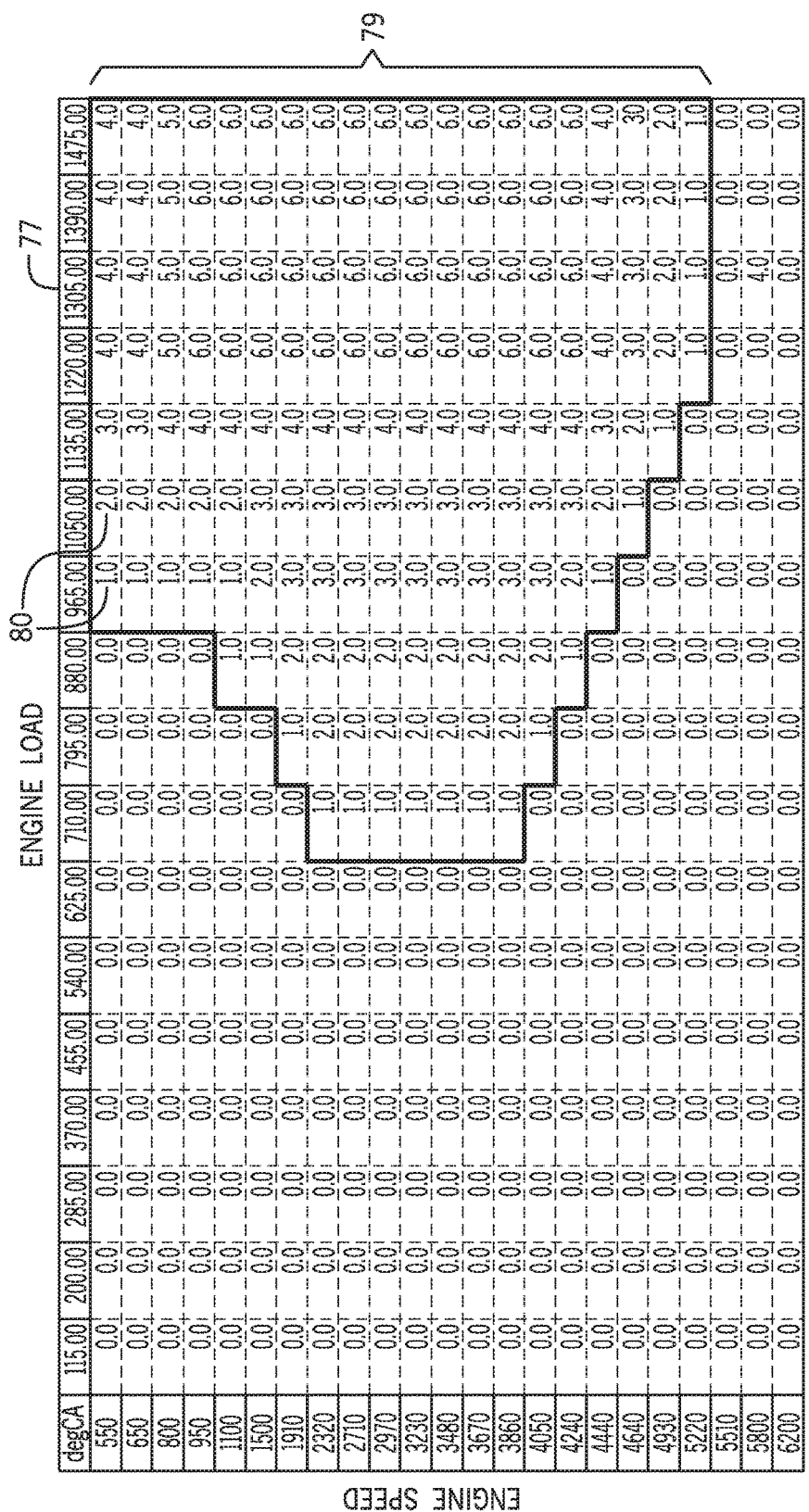
FIGS. 4A and 4B illustrate specific examples of lookup tables for determining an advanced spark timing and increased fuel injection according to one embodiment of the disclosed system and method.
Figure 4B:
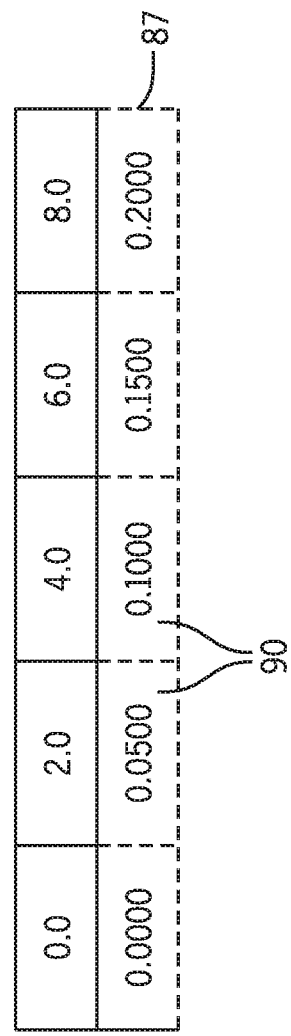

FIG. 4A exemplifies such a table, which contains spark advance offsets 80 in degrees BTDC which are added to the base spark time determined by the steady state controlled strategy. The fuel increase can then determined based on the spark advance offset, such as by utilization of a table providing fuel increase amounts according to spark advance offset amounts. FIG. 4B exemplifies such a table, which is a single row table providing fuel increase values 90 for respective spark advance offsets ranging from 0° to 8° BTDC. For example, the fuel increase table may provide fuel increase values 90 as a percentage increase, a multiplier, or an added amount to the base fuel injection amount provided by the steady-state control strategy.

FIG. 4A provides an exemplary spark offset table 77, a lookup table providing spark advance offsets 80 for a range of engine speeds and engine loads that capture all operating conditions for a given marine engine 10. Much of the lookup table provides a zero spark advance offset 80, such as at low engine loads and at very high engine speeds. The non-zero spark advance offsets 80 are concentrated in the offset region 79 shown as the shadowed portion of the spark offset table 77. The offset region 79 is concentrated on the region of the table 77 providing control for mid to high engine load conditions and low to moderate engine speed conditions. In general, the spark offset region 79 represents an area where the base spark values, such as provided by a base spark table, are retarded due to knock margin limitations. These offset region 79 conditions are encountered during initial acceleration of a marine vessel in a rapid acceleration, or "hole-shot," scenario when the marine vessel is accelerating from idle or low speed and the maximum amount of torque is required to accelerate the marine vessel as quickly as possible. In normal implementation of this transient control strategy for rapid acceleration, the marine engine 10 naturally advances through the offset region 79 as the engine speed increases. Thus, the spark offset table 77 is configured such that the spark advance offset 80 blends out to zero as the operating conditions advance through the table 77.

In other embodiments, filters may be applied to ramp in the offset. This may allow for reduction in the size of the offset table 77, which can save space in the ECU, because the table 77 can be narrowed down to a smaller set of engine loads and engine speeds where the offset is applied. When the strategy is activated, the selected spark advance offset is filtered in from the smaller map. Then when the software moves out of the rapid acceleration control strategy—either due to engine speed and load conditions moving out of the offset region or upon expiration of the timer—any remaining spark advance offset can be filtered out.

While in most conditions and situations the spark advance offset provided by the spark offset table 77 will naturally blend out to zero based on the table values, certain situations may arise where the engine load and speed remain in the offset region 79 for a prolonged period. Such situations may arise, for example, where the marine vessel is towing an object (e.g. a skier, a tuber, or another boat), or on a multi-engine vessel where one of the engines fails. In that situation, a timer is provided to monitor the duration of the rapid acceleration command strategy so that the spark advance offset and the fuel increase are not sustained for too long. For example, the spark advance offset and fuel increase amount may be forcibly removed or blended out after a predetermined period of time. The prevents occurrence of complications, such as fuel dilution of the lubricating oil, spark plug fouling, and $O_2$ sensor damage, which can arise from prolonged application of the rapid acceleration strategy described herein.

In one embodiment, a timer may be started upon detection of the rapid acceleration command, such as upon detection of the throttle lever movement from the lower threshold position 57A to the upper threshold position 57B within the predetermined time. Once the timer reaches the predetermined period, the spark advance offset may be reduced to zero over a period of time. For example, the spark advance offset value may be filtered or divided for a predetermined number of engine cycles or a predetermined time period so that the value is blended to zero and the user does not notice any sudden change in engine output. In one exemplary embodiment, the predetermined maximum period for implementing the rapid acceleration transient control strategy may be in the range of 10 to 15 seconds, which is a calibrateable value depending on the particular marine engine 10 and marine vessel configuration, as well as the expected application for the control strategy.

The fuel increase is determined based on the spark advance offset, such as by accessing a fuel increase table 87 exemplified in FIG. 4B. As shown in the exemplary fuel increase table 87, the fuel increase value 90 is zero when the spark advance offset is zero and the fuel increase value 90 is greater than zero when the spark advance offset is greater than zero. Likewise, as the spark advance offset increases, so does the associated fuel increase value 90. Accordingly, the control strategy increases the spark advance and the fuel increase in parallel with each other to provide temporary increased torque output while avoiding knock. In other words, the increased fuel reduces the knock risk and thus compensates for the advanced spark.

Figure 5:
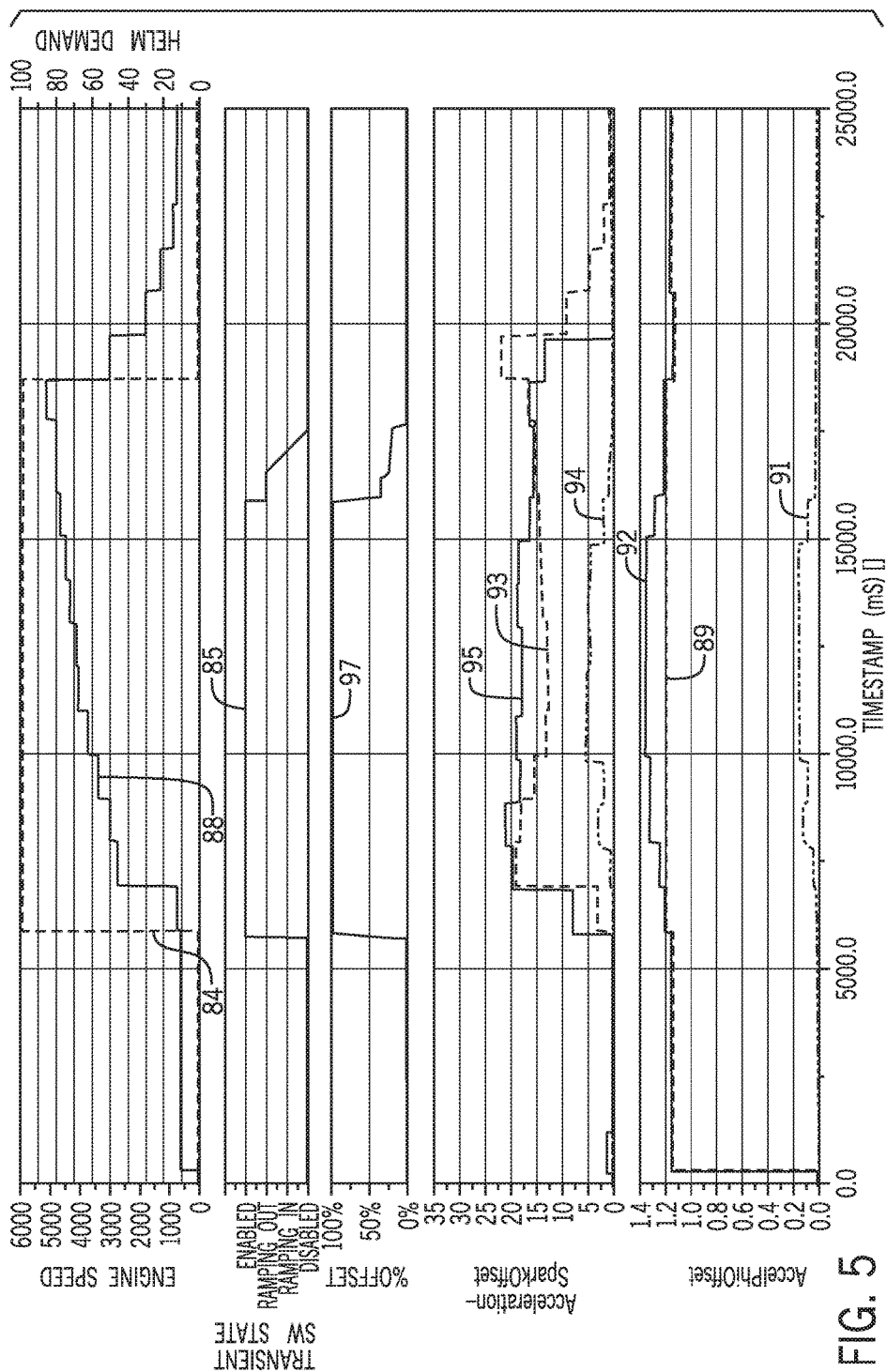
FIG. 5 is a set of graphs illustrating an instance of the disclosed system and method.

FIG. 5 provides graphs showing an exemplary rapid acceleration command and engine speed increase, and the corresponding fuel and spark control values provided in response to the rapid acceleration command. In the graphs, acceleration demands, fuel injection amounts, and spark timing are provided over time (provided in milliseconds on the X-axis).

The top graph set in FIG. 5 depicts the helm demand 84, which rises instantaneously from 0% to 100%. Line 84 depicts a rapid acceleration command from a user input device. As described above, the user input device may be the throttle lever 54, which in the example is moved almost instantaneously from 0% lever position to 100% lever position. Alternatively, the rapid acceleration command may be an input provided at a different user input device, such as a user input device specifically devised for providing a rapid acceleration command and thus engaging the rapid acceleration transient control strategy. Line 88 represents the engine speed, which increases rapidly following the rapid acceleration command.

Line 85 represents the state of the transient acceleration control strategy, which in this example transitions instantaneously from "disabled" to "enabled" (with no ramping in), which is triggered by receipt of the rapid acceleration command and initiates the rapid acceleration control strategy. A timer is started upon detection of the rapid acceleration, which gradually counts up toward the predetermined maximum period. After expiration of the predetermined maximum time period, the control state changes to "ramping out" in order to force the spark advance offset to zero over time (if it hasn't reached zero already prior to expiration of the predetermined maximum time period). Line 97 represents a multiplier for the spark advance offset value, which has a value of 1 until expiration of the predetermined maximum period and the decreases to a value of less than 1. Thereby, the spark advance offset is gradually reduced toward zero over a period of time.

The bottom of the graph depicted in FIG. 5 presents the fueling characteristics, which are determined based on the spark advance offset values, as described above. In the depicted embodiment, the base fuel injection amount is depicted at line 89, and the fuel increase is depicted at line 91. Specifically, line 91 depicts the fuel increase values 90 provided by the fuel increase table 87. The increased fuel injection amount, which is the total of the base fuel injection amount and the fuel increase, is depicted at line 92. The spark characteristics are represented at lines 93-95. Note that the fuel increase values become non-zero at the same time as the spark advance offset values, and increase and decrease with the spark advance offset values. The fuel increase values and spark advance offset values generally increase where the base spark time decreases due to the knock margin requirements.

Line 93 depicts the base spark time, such as determined by a lookup table providing base spark times calibrated for steady state operating conditions. Line 94 depicts the spark advance offset values, such as the values determined based on the spark offset table 77. As shown in the exemplary scenario, the base spark time decreases just after 7500 milliseconds, which is due to increased knock margin requirements at certain high engine load conditions. As the base spark time decreases, the spark advance increases such that the advanced spark timing, which is the total of the base spark and the spark advance offset, is maintained at a relatively stable value to provide increased torque output as compared to the torque output that would be provided using the base spark lookup table, or map. The fuel increase tracks the spark advance offset and compensates to avoid knock.

In the depicted embodiment, the spark advance offset decreases as the control inputs move naturally through the spark offset table 77. However, the spark offset is non-zero once the timer reaches the predetermined maximum period. Accordingly, the ramp out multiplier (line 97) drives the spark offset to zero within a period of time (or over a number of engine cycles) so that the driver does not notice a sudden chance in torque output. Thereby, complications due to the increased fuel injection amount can be avoided. In other examples where the spark offset reaches zero before expiration of the predetermined maximum period, the ramp out multiplier has no effect.

Figure 6:
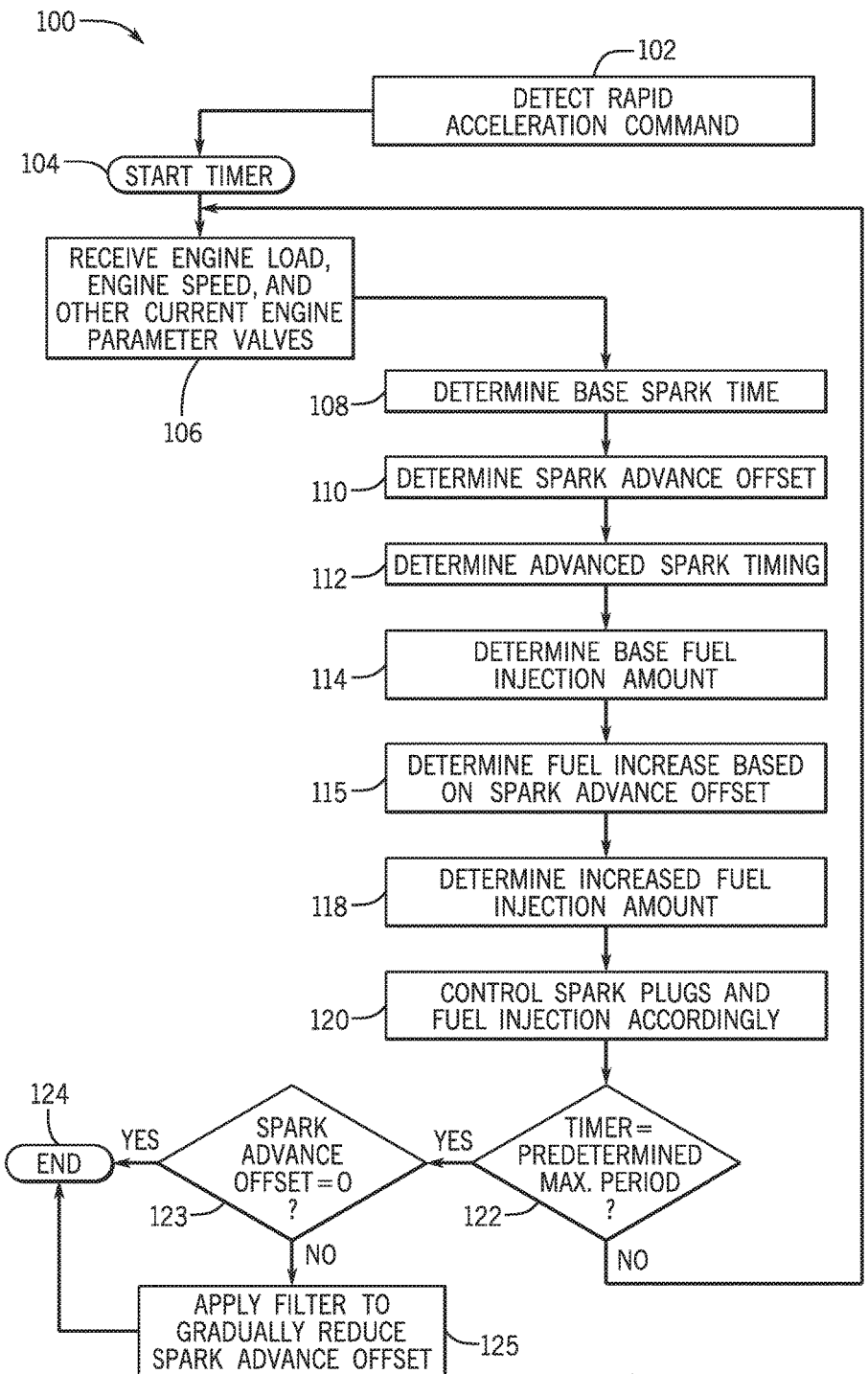
FIG. 6 is a flow chart depicting one embodiment of a method for controlling a marine engine according to the present disclosure.

FIG. 6 depicts one embodiment of a method 100 of controlling a marine engine for propelling a marine vessel in response to rapid acceleration command. A rapid acceleration command is detected at step 102, such as based on the throttle lever 54 position as described above. A timer is started at step 104 and current engine parameter values are received at step 106, including current engine load and engine speed. A base spark time is determined at the step 108 and a spark advance offset is determined at step 110. An advanced spark timing is the determined at step 112, for example as the sum of the base spark time and base spark advance offset. A base fuel injection amount is then determined at step 114, and a fuel increase is then determined at step 115 based on the spark advance offset. An increased fuel injection amount is then determined at step 118, for example as the sum or the product of the base fuel injection amount and the fuel increase (based on the format of the fuel increase value). At step 120, the spark plugs are controlled based on the advanced spark timing, and the fuel injectors are controlled in order to deliver the increased fuel injection amount. Instructions are executed at step 122 to determine whether the timer has reached the predetermined maximum period. If not, then the rapid acceleration transient control strategy continues by repeating the above-described steps until either the spark advance offset naturally phases out to zero or the timer reaches the predetermined maximum period. If the predetermined maximum period is reached, and the spark advance offset is not equal to zero at step 123, then a filter is applied, as represented at step 125, to gradually reduce the spark advance offset over a period of time and/or a number of engine cycles. The control strategy ends at step 124 if the spark advance offset is determined to be zero, or after the filter period has expired. In other embodiments, the filter may be automatically applied regardless of the spark advance offset, which would have no effect unless the spark advance offset is non-zero.

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

What is claimed is:

1. A method for controlling a marine engine for propelling a marine vessel, the method comprising:
   receiving user input at a user input device to control acceleration of a marine vessel;
   detecting a rapid acceleration command based on the user input;
   determining an advanced spark timing based on at least one of engine speed and engine load, wherein the advanced spark timing adjusts a base spark time by a spark advance offset;
   determining a fuel increase based on the spark advance offset;
   determining an increased fuel injection amount by increasing a base fuel injection amount by the fuel increase; and
   controlling a spark for one or more cylinders of the marine engine based on the advanced spark timing and controlling fuel delivery for the one or more cylinders of the marine engine based on the increased fuel injection amount.

2. The method of claim 1, further comprising determining the advanced spark timing and the increased fuel injection amount for a predetermined maximum period following the detection of the rapid acceleration command.

3. The method of claim 2, further comprising:
   starting a timer upon detecting the rapid acceleration command;
   if the spark advance is non-zero once the timer reaches the predetermined maximum period, gradually reducing the spark advance offset to zero over a period of time.

4. The method of claim 3, wherein the fuel increase increases as the spark advance offset increases.

5. The method of claim 2, wherein the fuel increase is zero when the spark advance offset is zero and the fuel increase is nonzero when the spark advance offset is nonzero.

6. The method of claim 5, wherein the spark advance increases for high load conditions where the base spark time is retarded due to knock margin limitations.

7. The method of claim 1, wherein the user input device is a throttle lever, and wherein the rapid acceleration command is detected based on position of the throttle lever over time.

8. The method of claim 7, wherein detecting the rapid acceleration command includes detecting that the throttle lever position has changed from below a lower threshold position to above an upper threshold position within a predetermined time.

9. The method of claim 8, wherein the lower threshold is 10% of a maximum lever position and the upper threshold is 90% of a maximum lever position and the predetermined time is less than three seconds.

10. The method of claim 1, further comprising determining the spark advance offset based on at least one of the engine speed and the engine load;
    wherein the advanced spark timing is the base spark time adjusted by the spark advance offset, and wherein determining the spark advance offset includes accessing a lookup table containing spark advance offsets in crank angle degrees based on engine speed and engine load values.

11. The method of claim 1, wherein determining the fuel increase includes accessing a lookup table containing multipliers based on spark advance offsets, and wherein determining the increased fuel injection amount includes multiplying the base fuel injection amount by the fuel increase.

12. A marine propulsion system comprising:
    a marine internal combustion engine having a plurality of pistons that move within cylinders to cause rotation of a crankshaft;
    a user input device for controlling acceleration of a marine vessel;
    a control module configured to:
       detect a rapid acceleration command provided at the user input device;
       determine a spark advance offset based on at least one of engine speed and engine load;
       determine an advanced spark timing based on at least one of engine speed and engine load, wherein the advanced spark timing adjusts a base spark time by a spark advance offset;
       determine a fuel increase based on the spark advance offset;
       determine an increased fuel injection amount by increasing a base fuel injection amount by the fuel increase; and
       control a spark for one or more cylinders of the marine engine based on the advanced spark timing and controlling fuel delivery for the one or more cylinders of the marine engine based on the increased fuel injection amount.

13. The system of claim 12, wherein the control module is further configured to determine the advanced spark timing and the increased fuel injection amount for a predetermined maximum period following the detection of the rapid acceleration command.

14. The system of claim 13, wherein the control module is further configured to:
    start a timer upon detecting the rapid acceleration command; and
    if the spark advance is non-zero once the timer reaches the predetermined maximum period, gradually reducing the spark advance offset to zero over a period of time.

15. The system of claim 13, wherein the fuel increase is zero when the spark advance offset is zero, and wherein the fuel increase increases as the spark advance offset increases.

16. The system of claim 13, wherein the control module is further configured to access a lookup table containing fuel increases based on spark advance offsets, wherein the fuel increases are percentage increase values or multipliers that are applied to the base fuel injection amount to determine the increased fuel injection amount.

17. The system of claim 16, wherein the control module is further configured to:
    determine the spark advance offset based on at least one of the engine speed and the engine load;
    access a lookup table containing spark advance offsets in crank angle degrees based on engine speed and engine load values; and
    wherein the advanced spark timing is the base spark time adjusted by the spark advance offset.

18. The method of claim 17, wherein the spark advance offsets in the table increase for high load conditions where the base spark time is retarded due to knock margin limitations.

19. The system of claim 12, wherein the rapid acceleration command is detected based on position of a throttle lever over time.

20. The system of claim 19, wherein the rapid acceleration command is detected when the throttle lever has moved from below a lower threshold position to above an upper threshold position within a predetermined time.

* * * * *